US012693848B2

(12) United States Patent
Zhu et al.

(10) Patent No.: US 12,693,848 B2
(45) Date of Patent: Jul. 28, 2026

(54) SYSTEM AND METHOD FOR AUTOMATICALLY REDEPLOYING CONTAINERS ON MULTIPLE NODES IN AN INFORMATION TECHNOLOGY INFRASTRUCTURE BASED ON PATCHES

(71) Applicant: International Business Machines Corporation, Armonk, NY (US)

(72) Inventors: Han Wen Zhu, Beijing (CN); Xiao Ling Chen, Beijing (CN); Kui Zhang, TianJin (CN); Wen Bin Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 18/585,475

(22) Filed: Feb. 23, 2024

(65) Prior Publication Data

US 2025/0272078 A1 Aug. 28, 2025

(51) Int. Cl.
*G06F 8/65* (2018.01)
*G06F 8/61* (2018.01)
(Continued)

(52) U.S. Cl.
CPC ................. *G06F 8/65* (2013.01); *G06F 8/63* (2013.01); *G06F 8/71* (2013.01); *G06F 9/45558* (2013.01)

(58) Field of Classification Search
CPC ........................................................ G06F 8/65
See application file for complete search history.

(56) References Cited

U.S. PATENT DOCUMENTS 10,002,247 B2 * 6/2018 Suarez ................... G06F 21/31
10,324,708 B2 * 6/2019 Griffin ...................... G06F 8/63
(Continued)

FOREIGN PATENT DOCUMENTS

WO 2025/242439 A1 11/2025

OTHER PUBLICATIONS

Aleshkina, Alina. "Migrating configuration management systems to containers." (2017).*
(Continued)

*Primary Examiner* — Francisco J Aponte
(74) *Attorney, Agent, or Firm* — Cantor Colburn LLP; Aaron Pontikos

(57) ABSTRACT

A method for automatically redeploying containers on multiple nodes in an IT infrastructure based on patches includes installing a FixPackID attribute, a Sync Patch command, an Image Specific Patch Relation Directed Graph Producer (ISPRDGP) module and an Image Specific Patch Relation Directed Graph Consumer (ISPRDGC) module into an automated deployment software having an automated deployment software configuration/deployment tool, running the automated deployment software configuration/deployment tool to update the FixPackID attribute into a metadata file of a new layer, update the FixPackID in a manifest item, and push the manifest item and the new layer to a repository and running the automated deployment software configuration/deployment tool to install the FixPackID into a manifest list, identify a FixPackID whose parentID is a target layer, confirm a patch type, implement a CORE for the new layer located within a production environment and install the new patch onto the production environment.

20 Claims, 10 Drawing Sheets

Installing a FixPackID attribute and a Sync Patch command in the automated deployment software 402

Installing an Image Specific Patch Relation Directed Graph Producer (ISPRDGP) module into the automation engine of the automated deployment software 404

Installing an Image Specific Patch Relation Directed Graph Consumer (ISPRDGC) module into the Graph Driver of the automated deployment software 406

Running the automated deployment software configuration and deployment tool to update the FixPackIDinto the metadata of the new layers and the manifest item and to push the manifest and the new layers to the repository 408

Running the automated deployment software configuration and deployment tool to install the FixPackIDinto the manifest list and to install the patches on the production environment 410

400

(51) Int. Cl.
    *G06F 8/71*            (2018.01)
    *G06F 9/455*         (2018.01)

(56)            References Cited

U.S. PATENT DOCUMENTS

| | | | |
|---|---|---|---|
| 10,719,345 B2 * | 7/2020 | Du | G06F 9/45545 |
| 10,824,489 B2 | 11/2020 | Caldato et al. | |
| 10,990,286 B1 | 4/2021 | Srinivasan et al. | |
| 11,635,908 B2 | 4/2023 | Switzer et al. | |
| 11,836,473 B2 * | 12/2023 | Franchitti | G06F 8/65 |
| 12,020,016 B2 * | 6/2024 | Chibon | G06F 9/45533 |
| 12,182,559 B2 * | 12/2024 | Chen | G06F 9/5077 |
| 12,190,144 B1 * | 1/2025 | Featonby | H04L 67/568 |
| 12,333,289 B2 * | 6/2025 | Sree Prakash | G06F 8/63 |
| 12,360,756 B2 * | 7/2025 | Douglas | G06F 9/45558 |
| 2010/0095289 A1 | 4/2010 | Nguyen et al. | |
| 2016/0085543 A1 | 3/2016 | Islam et al. | |
| 2018/0088926 A1 | 3/2018 | Abrams | |
| 2018/0136931 A1 * | 5/2018 | Hendrich | G06F 11/30 |
| 2018/0367592 A1 | 12/2018 | Thomas et al. | |
| 2019/0347121 A1 | 11/2019 | Luo et al. | |
| 2020/0082094 A1 | 3/2020 | Mcallister et al. | |
| 2020/0097662 A1 | 3/2020 | Hufsmith et al. | |
| 2020/0356806 A1 * | 11/2020 | Li | G06F 18/22 |
| 2021/0240734 A1 * | 8/2021 | Shah | G06F 8/63 |
| 2021/0255846 A1 * | 8/2021 | Mamgain | H04L 67/34 |
| 2022/0197689 A1 * | 6/2022 | Hotinger | G06F 9/45558 |
| 2022/0229647 A1 * | 7/2022 | Mathews | G06F 8/63 |
| 2023/0025529 A1 | 1/2023 | Fu et al. | |
| 2023/0058477 A1 | 2/2023 | Jiang et al. | |
| 2023/0091915 A1 * | 3/2023 | Chen | G06F 8/658 |
| | | | 717/168 |
| 2025/0328318 A1 * | 10/2025 | Vaughn | G06F 8/34 |

OTHER PUBLICATIONS

Gudipati, Sai Vivek, and Vishwa Mithra Tatta. "Investigation of an automatic deployment transformation method for OpenStack." (2022).*

Emília Chovancová—"Automated Deploying, Securing, and Backing up of Web Services Using Ansible on Linux VM"; Brno University of Technology—Master's Thesis, Oct. 2, 2025.*

Chen et al., "Automatic Redeploying/Upgrading of Containers on Multiple Nodes in an Information Technology Infrastructure Based on Unavailable Patches", U.S. Appl. No. 18/672,100, filed May 23, 2024.

List of IBM Patents or Patent Applications Treated as Related; (Appendix P); Date Filed: May 23, 2024, 2 pages.

Anonymous, "A Method of Rolling Upgrade for Different Layers in a Container Orchestration System", IPCOM000260831D, IP.com, Dec. 26, 2019, 4 pages.

Anonymous, "Performing automated in-place cluster upgrades", URL: https://access.redhat.com/documentation/en-us/openshift_container_platform/3.11/html/upgrading_clusters/install-config-upgrading-automated-upgrades, (Retrieved: Feb. 23, 2024), 35 pages.

Anonymous, "System and Method for Adapting the Deployment ConfigurationAcross Cloud Vendors in Response to Automatic Upgrades ofContainerized Application", IPCOM000270358D, IP.com, Jul. 1, 2022, 5 pages.

Yue et al., "Computer Multi-Application Deployment", U.S. Appl. No. 18/332,219, filed Jun. 9, 2023.

International Searching Authority, "Notification of Transmittal of the International Search Report and the Written Opinion of the International Searching Authority, or Declaration," Patent Cooperation Treaty, Jun. 30, 2025, 16 pages, International Application No. PCT/EP2025/062597.

* cited by examiner

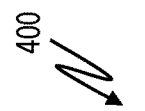

Installing a FixPackID attribute and a Sync Patch command in the automated deployment software  402

Installing an Image Specific Patch Relation Directed Graph Producer (ISPRDGP) module into the automation engine of the automated deployment software  404

Installing an Image Specific Patch Relation Directed Graph Consumer (ISPRDGC) module into the Graph Driver of the automated deployment software  406

Running the automated deployment software configuration and deployment tool to update the FixPackIDinto the metadata of the new layers and the manifest item and to push the manifest and the new layers to the repository  408

Running the automated deployment software configuration and deployment tool to install the FixPackIDinto the manifest list and to install the patches on the production environment  410

FIG. 5

New

SYSTEM AND METHOD FOR AUTOMATICALLY REDEPLOYING CONTAINERS ON MULTIPLE NODES IN AN INFORMATION TECHNOLOGY INFRASTRUCTURE BASED ON PATCHES

BACKGROUND

The present invention generally relates to redeploying containers in an Information Technology (IT) infrastructure, and more particularly to a system and method for automatically redeploying containers on multiple nodes in an IT infrastructure based on patches.

Ansible is a popular, simple and well-adopted automation language that describes the IT application infrastructure. It automates manual deployment logic, simplifies the deployment process, and improves deployment efficiency. Containers are packages of software that contain all of the necessary elements to run in any IT environment and allow developers to isolate and run multiple applications on a single operating system instead of dedicating a virtual machine to each application on a server. Because Ansible and/or similar tools are typically used to deploy multiple services on multiple nodes, special attention must be paid to the version compatibility of the applications depending on when the applications are upgraded.

SUMMARY

A system and method for automatically redeploying containers on multiple nodes in an IT infrastructure based on patches is provided, where the method includes installing a FixPackID attribute and a Sync Patch command into an automated deployment software having an automated deployment software configuration and deployment tool, installing an Image Specific Patch Relation Directed Graph Producer (ISPRDGP) module into an automation engine of the automated deployment software, installing an Image Specific Patch Relation Directed Graph Consumer (IS-PRDGC) module into a graph driver of the automated deployment software, running the automated deployment software configuration and deployment tool to cause the ISPRDGP to update the FixPackID into a metadata file of new layers during a building image operation, update the FixPackID in a manifest item, and push the manifest item and the new layers to a repository and running the automated deployment software configuration and deployment tool to cause the ISPRDGC to install the FixPackID into a manifest list, identify a FixPackID whose parentID is a target layer, confirm a patch type for a patch, implement a CORE for image layers located within a production environment, and install the patch onto a production environment of the IT infrastructure.

Embodiments of the invention are also directed to computer-implemented methods and computer program products having substantially the same features and functionality as the computer system described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 is an operational block diagram illustrating a method for automatically redeploying containers on multiple nodes in an IT infrastructure based on patches, in accordance with one or more embodiments of the present invention;

DETAILED DESCRIPTION

Figures 1A, 1B:
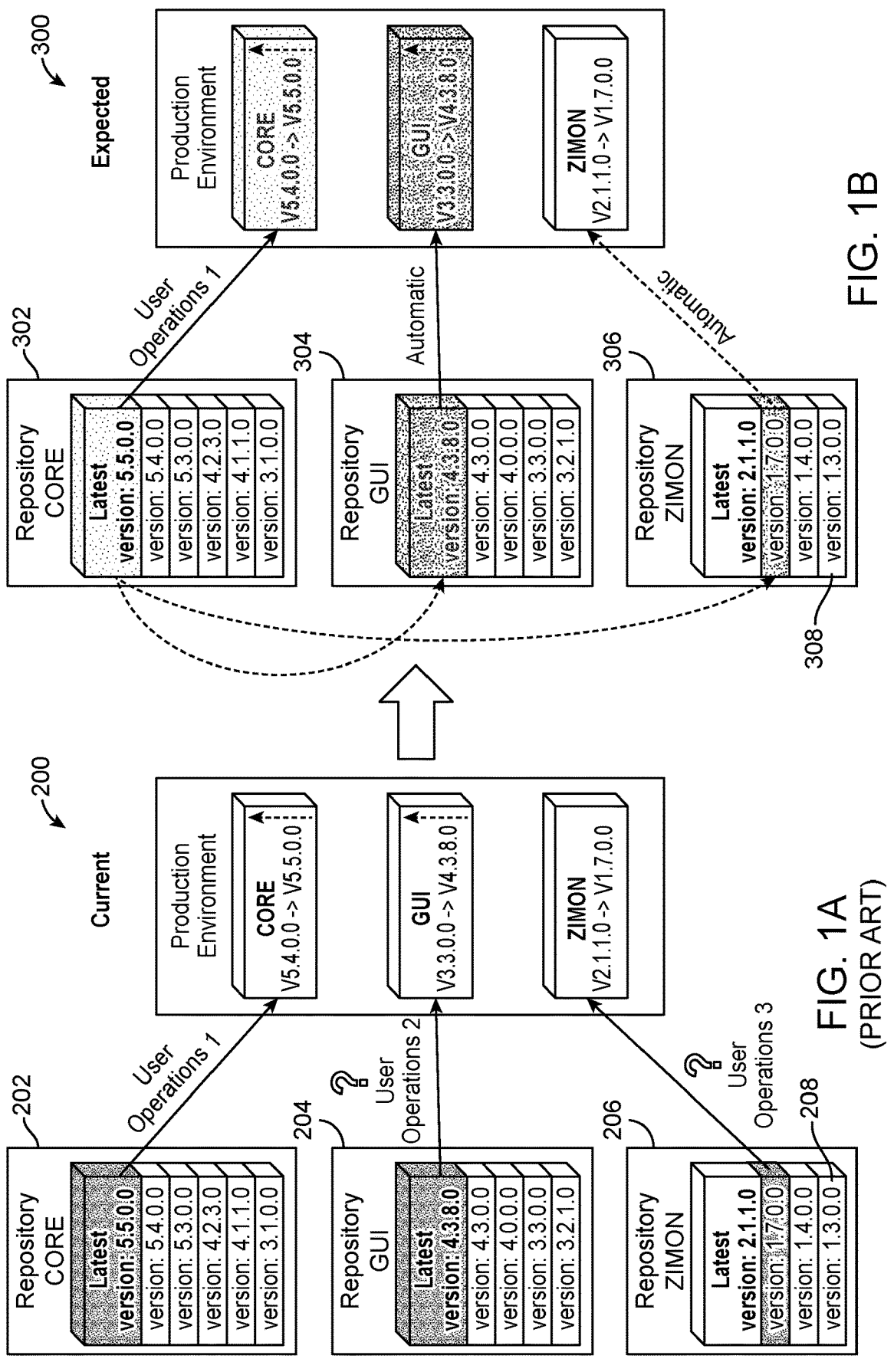
FIG. 1A shows a block diagram illustrating the relationship of a repository CORE, a repository GUI, a repository ZIMON and a production environment, in accordance with the prior art.
FIG. 1B shows a block diagram illustrating the relationship of a repository CORE, a repository GUI, a repository ZIMON and a production environment, in accordance with an embodiment of the present invention.

In an embodiment of the invention, a method for automatically redeploying containers on multiple nodes in an IT infrastructure based on patches includes installing a FixPackID attribute and a Sync Patch command into an automated deployment software having an automated deployment software configuration and deployment tool. An Image Specific Patch Relation Directed Graph Producer (IS-PRDGP) module and an Image Specific Patch Relation Directed Graph Consumer (ISPRDGC) module are installed into the automated deployment software. The automated deployment software configuration and deployment tool is run to cause the ISPRDGP to update the FixPackID into a metadata file of a new layer during a building image operation, update the FixPackID in a manifest item, and to push the manifest item and the new layer to a repository. Additionally, the automated deployment software configuration and deployment tool is run to cause the ISPRDGC to install the FixPackID into a manifest list, identify a FixPackID whose parentID is a target layer, confirm a patch type for a new patch, implement a CORE for the new layers located within a production environment, and to install the new patch onto a production environment of the IT infrastructure. The method advantageously allows for an automatic redeployment and/or upgrade of containers on multiple nodes by automatically updating a dynamic version dependency as more and more patches are delivered over time.

In some examples of the method, installing a FixPackID attribute and a Sync Patch command includes running the automated deployment software configuration and deployment tool to install the FixPackID attribute and the Sync Patch Command.

In further examples of the method, installing an Image Specific Patch Relation Directed Graph Producer (IS-PRDGP) module includes running the automated deployment software configuration and deployment tool to install the ISPRDGP module into an automation engine of the automated deployment software.

In yet further examples of the method, installing an Image Specific Patch Relation Directed Graph Consumer (IS-PRDGC) module includes running the automated deployment software configuration and deployment tool to install the ISPRDGC module into a graph driver of the automated deployment software.

In yet further examples of the method, the FixPackID attribute is configured to record a relationship between a previous layer and a patch layer on the repository and to create a new attribute of metadata for the patch layer and for a manifest configuration file.

In still yet further examples of the method, the FixPackID attribute includes information about a previous layer's ImageID, a patch type and a patch description, wherein the patch description includes record patch information.

In yet further examples of the method, if the new layer is for adding a new patch, then updating the FixPackID responsive to an image ID of the new layer and a patch type and patch description of the new patch.

In another aspect of the invention, a computing system includes a machine learning system for implementing a method for automatically redeploying containers on multiple nodes in an IT infrastructure based on patches. The method includes installing a FixPackID attribute and a Sync Patch command into an automated deployment software having an automated deployment software configuration and deployment tool. An Image Specific Patch Relation Directed Graph Producer (ISPRDGP) module and an Image Specific Patch Relation Directed Graph Consumer (ISPRDGC) module are installed into the automated deployment software. The automated deployment software configuration and deployment tool is run to cause the ISPRDGP to update the FixPackID into a metadata file of a new layer during a building image operation, update the FixPackID in a manifest item, and to push the manifest item and the new layer to a repository. Additionally, the automated deployment software configuration and deployment tool is run to cause the ISPRDGC to install the FixPackID into a manifest list, identify a FixPackID whose parentID is a target layer, confirm a patch type for a new patch, implement a CORE for the new layers located within a production environment, and to install the new patch onto a production environment of the IT infrastructure. The computer system provides a physical system for implementing a method which advantageously allows for an automatic redeployment and/or upgrade of containers on multiple nodes by automatically updating a dynamic version dependency as more and more patches are delivered over time.

In some examples of the computing system, installing a FixPackID attribute and a Sync Patch command includes running the automated deployment software configuration and deployment tool to install the FixPackID attribute and the Sync Patch Command.

In further examples of the computing system, installing an Image Specific Patch Relation Directed Graph Producer (ISPRDGP) module includes running the automated deployment software configuration and deployment tool to install the ISPRDGP module into an automation engine of the automated deployment software.

In yet further examples of the computing system, installing an Image Specific Patch Relation Directed Graph Consumer (ISPRDGC) module includes running the automated deployment software configuration and deployment tool to install the ISPRDGC module into a graph driver of the automated deployment software.

In yet further examples of the computing system, the FixPackID attribute is configured to record a relationship between a previous layer and a patch layer on the repository and to create a new attribute of metadata for the patch layer and for a manifest configuration file.

In yet further examples of the computing system, the FixPackID attribute includes information about a previous layer's ImageID, a patch type and a patch description, wherein the patch description includes record patch information.

In yet further examples of the computing system, if the new layer is for adding a new patch, then updating the FixPackID responsive to an image ID of the new layer and a patch type and patch description of the new patch.

Yet another aspect of the invention includes a computer program product having a computer readable storage medium. The computer readable storage medium stores program instructions which are executable by a processor to cause the processor to perform operations for implementing a method for automatically redeploying containers on multiple nodes in an IT infrastructure based on patches. The method includes installing a FixPackID attribute and a Sync Patch command into an automated deployment software having an automated deployment software configuration and deployment tool. An Image Specific Patch Relation Directed Graph Producer (ISPRDGP) module and an Image Specific Patch Relation Directed Graph Consumer (ISPRDGC) module are installed into the automated deployment software. The automated deployment software configuration and deployment tool is run to cause the ISPRDGP to update the FixPackID into a metadata file of a new layer during a building image operation, update the FixPackID in a manifest item, and to push the manifest item and the new layer to a repository. Additionally, the automated deployment software configuration and deployment tool is run to cause the ISPRDGC to install the FixPackID into a manifest list, identify a FixPackID whose parentID is a target layer, confirm a patch type for a new patch, implement a CORE for the new layers located within a production environment, and to install the new patch onto a production environment of the IT infrastructure. The computer system product provides a physical means for distributing and installing on a computer system, a method which advantageously allows for an automatic redeployment and/or upgrade of containers on multiple nodes by automatically updating a dynamic version dependency as more and more patches are delivered over time.

In some examples of the computer program product, installing a FixPackID attribute and a Sync Patch command includes running the automated deployment software configuration and deployment tool to install the FixPackID attribute and the Sync Patch Command.

In further examples of the computer program product, installing an Image Specific Patch Relation Directed Graph Producer (ISPRDGP) module includes running the auto- mated deployment software configuration and deployment tool to install the ISPRDGP module into an automation engine of the automated deployment software.

In yet further examples of the computer program product, installing an Image Specific Patch Relation Directed Graph Consumer (ISPRDGC) module includes running the auto- mated deployment software configuration and deployment tool to install the ISPRDGC module into a graph driver of the automated deployment software.

In yet further examples of the computer program product, the FixPackID attribute is configured to record a relationship between a previous layer and a patch layer on the repository and to create a new attribute of metadata for the patch layer and for a manifest configuration file.

In yet further examples of the computer program product, the FixPackID attribute includes information about a previ- ous layer's ImageID, a patch type and a patch description, wherein the patch description includes record patch infor- mation.

Typically, upgrading applications involves simultane- ously upgrading a batch of applications, so version compat- ibility control for multiple interdependent applications on multiple nodes is both important and difficult. In some situations, service providers need to continuously deliver various patches to multiple versions in the service loop simultaneously, where these patches include new features, Common Vulnerabilities and Exposure (CVE)-related patches, normal error fixes, etc. This continuous delivery is especially important for CVE patches due to security main- tenance of specific versions of products and for reducing the workload of production exploitation. Unfortunately, how- ever, an issue arises involving the need to redeploy produc- tion environments using the continuously upgraded image versions with key patches (e.g., automatic security fixes) because current systems cannot automatically update the dynamic version dependency as more and more patches are delivered over time. Accordingly, this issue becomes increasingly difficult and critical with large projects that frequently update product versions and that continuously add various patches to existing versions.

The present invention relates to a system and method for automatically redeploying containers on multiple nodes in an IT infrastructure based on patches, according to an embodiment. The invention provides a method for automati- cally redeploying or upgrading containers on multiple nodes on a system in an IT infrastructure by automatically updating the dynamic version dependency as more and more patches are delivered over time to reduce the side effects of container upgrading on the enterprise-level production environment to as little as possible. The method introduces a new attribute, "FixPackID", to the metadata of the image layer and to the config file of the manifest item. The FixPackID attribute records the specific relationship between the original image layer and its patch and includes the image ID of the parent image layer, the patch type and a patch description (each of which may be separated by a colon).

The method further introduces a new command, "Sync patch", as a new statement of an automated deployment software configuration and deployment tool, such as the ansible playbook, to invoke redeployed containers located on multiple nodes and install the required patch type or specific patch i.e. a CVE number.

The method includes introducing an Image Specific Patch Relation Direct Graph Producer (ISPRDGP) module into the Graph driver to generate a FixPackID for the parent layer, including the patch(es) type and patch description. The ISPRDGP then updates the newly added FixPackID attribute into the metadata of the new image layer while building a new image. The ISPRDGP also updates the FixPackID attribute as a new configuration attribute of a manifest item into the manifest file during a push of new imagery into the repository. Additionally, the method involves introducing an Image Specific Patch Relation Direct Graph Consumer (ISPRDGC) module into an automation engine (or some other cloud exploitation or management tool) of an auto- mated deployment software, such as Ansible, to read the manifest item with the installed image and compare the ImageID of the parent layer with the FixPackID recorded in the manifest item to obtain the corresponding manifest item of the new patch image. The ISPRDGC downloads the complete dependent set of images which have the required patches and implements on-demand deployment and upgrade of multiple applications located on multiple nodes. This approach is not only transparent to both the developer of the image and to the end user, but the approach also allows a user to specify how to download images and how to automatically update related images with specific patch types or FixPackID, thereby allowing for more flexibility and efficiency in upgrading multiple applications, such as situations that may occur with large projects.

It should be appreciated that a method for automatically redeploying containers on multiple nodes in an IT infra- structure based on patches is provided and is described as being used with IT automation software, such as the Ansible IT automation software, which includes the Ansible Play- book configuration and deployment tool. It should be appre- ciated that although the invention is discussed herein with regards to the Ansible IT automation software, the invention is compatible, and thus implementable, with other auto- mated deployment software, such as Chef, SaltStack, etc. Moreover, as other automated deployment software provide software tools (i.e., "Chef's Cookbook" "Salt's States", etc.) which operate similarly in concept to the Ansible Playbook tool, the invention may be implemented with other auto- mated deployment software by introducing a "Sync patch" command into the automated deployment software's con- figuration and deployment tool ("Chef's Cookbook" "Salt's States", etc.).

Figures 2A, 2B:
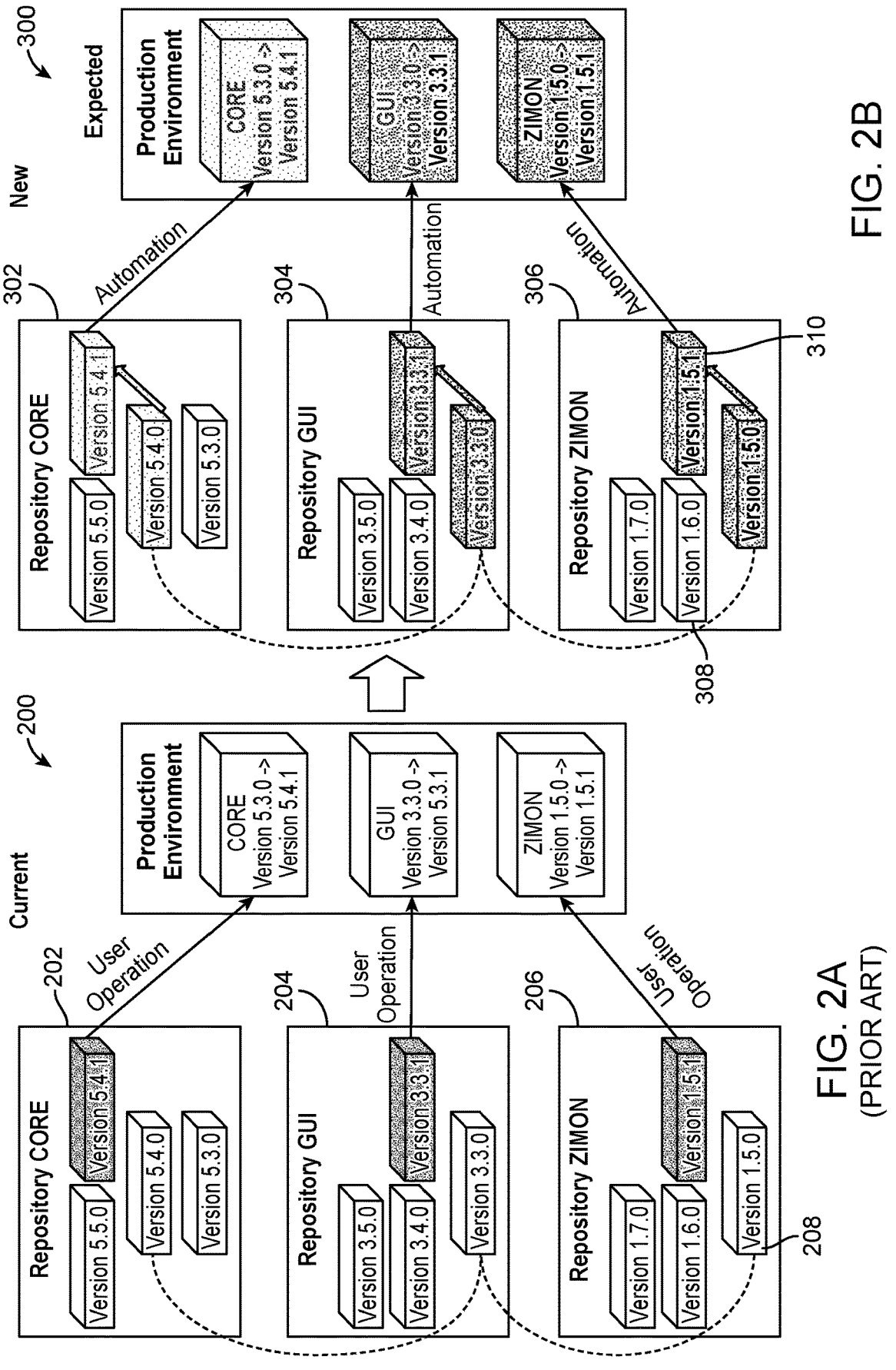
FIG. 2A shows a block diagram illustrating the relationship of a repository CORE, a repository GUI, a repository ZIMON and a production environment, in accordance with the prior art.
FIG. 2B shows a block diagram illustrating the relationship of a repository CORE, a repository GUI, a repository ZIMON and a production environment, in accordance with an embodiment of the present invention.

Referring to FIG. 1A and FIG. 2A, a block diagram 200 illustrating one scenario where the current configuration of a Repository CORE 202, Repository Graphical User Inter- face (GUI) 204 and a Repository ZIMON (i.e., collector) 206 of an application (such as Ansible) is illustrated, wherein each include multiple versions of patches 208. As can be seen, the current configuration requires a user opera- tion to identify and implement the most up to date patch. This current approach is open to errors and is time-consum- ing because it requires the user to update the containers with the most up to date patches. In accordance with an embodi- ment and referring to FIG. 1B and FIG. 2B, a block diagram 300 illustrating an embodiment where the method of the invention is implemented includes a Repository CORE 302, a Repository Graphical User Interface (GUI) 304 and a Repository ZIMON (i.e., collector) 306 of an application (such as Ansible) is illustrated, wherein each include mul- tiple versions of patches 308. In this embodiment, the latest version of patches 310 are automatically identified and the patches are automatically updated to the product environ- ment on a dynamic basis.

Figure 3:
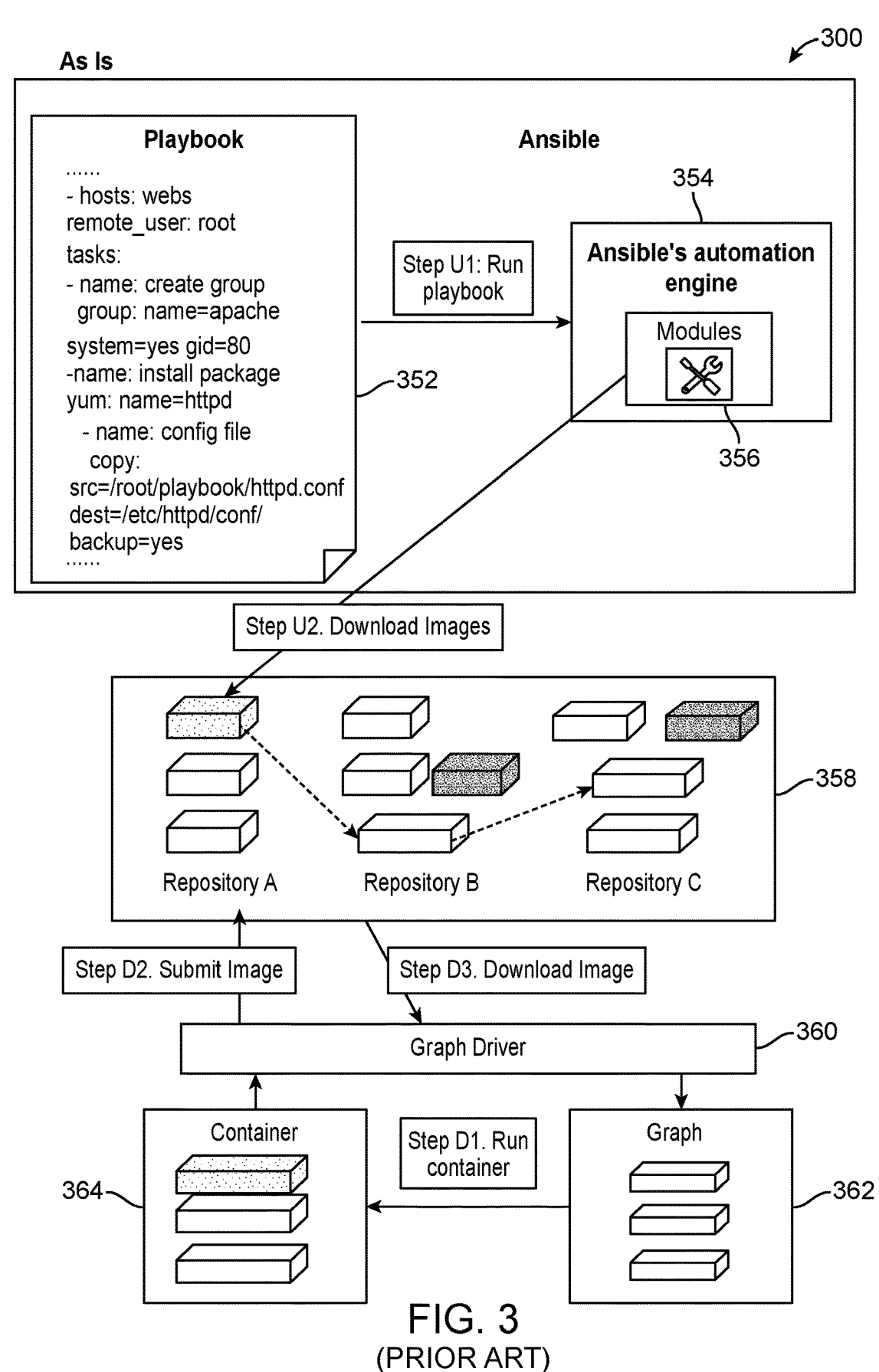
FIG. 3 shows a block diagram illustrating the architecture of an Ansible software program for use in accordance with the prior art.

Referring to FIG. 3, a block diagram 350 illustrating the current method for updating containers on an Ansible application is shown, where the user implements the operation of running the Ansible playbook 352 to implement Ansible's automation engine 354 and the modules 356 contained therein. The images contained within the modules are downloaded and stored in the appropriate repository 358. The images are downloaded from the repository and communicated to graph driver 360 which stores the appropriate images within the appropriate graphs 362. The container 364 is then run to update the appropriate container 364 with the latest version of the appropriate image, where the appropriate image is then communicated and stored in the appropriate repository 358 via the graph driver 360.

It should be appreciated that the invention makes it possible to download image layers with related patches in an on-demand fashion and automatically deploy and update the image layers with as little impact as possible on the enterprise user's production environments. The invention reduces unnecessary downloads of image layers by automatically obtaining dependency versions with wanted patches, which not only improves the efficiency of deployment, but also reduces the side effects of redeployment on the production environments. The invention also provides a method where both developers and users can easily maintain and upgrade the whole environment without the need for extra work related to patches issue that may occur on some image layer versions. 4. Moreover, the invention is compatible with and may be implemented with current container tools (i.e., Docker, Podman, etc.).

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as for automatically redeploying containers on multiple nodes in an IT infrastructure based on patches 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Figure 4:
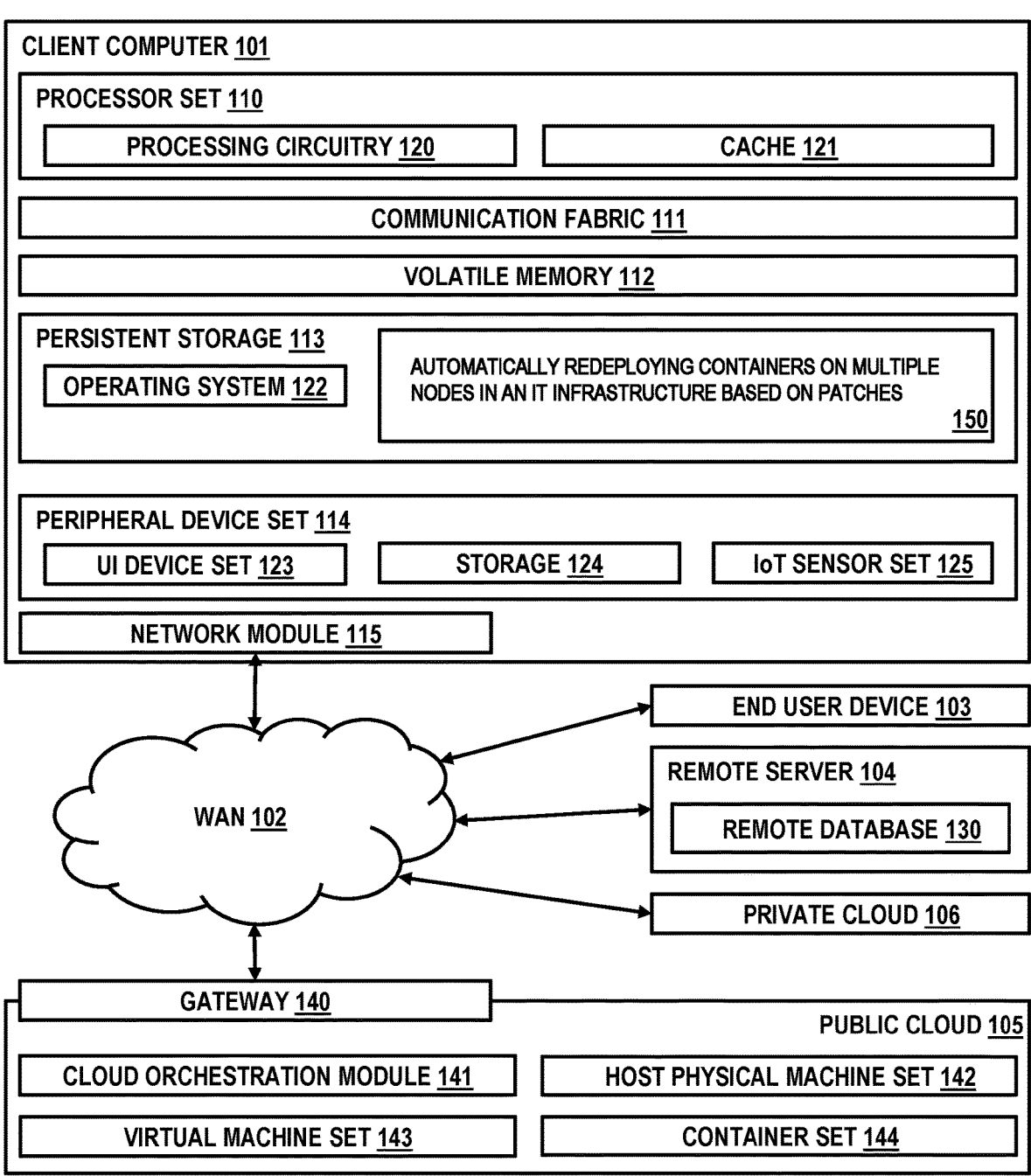
FIG. 4 shows a block diagram of an example computer system for use in accordance with one or more embodiments of the present invention.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 4. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 6:
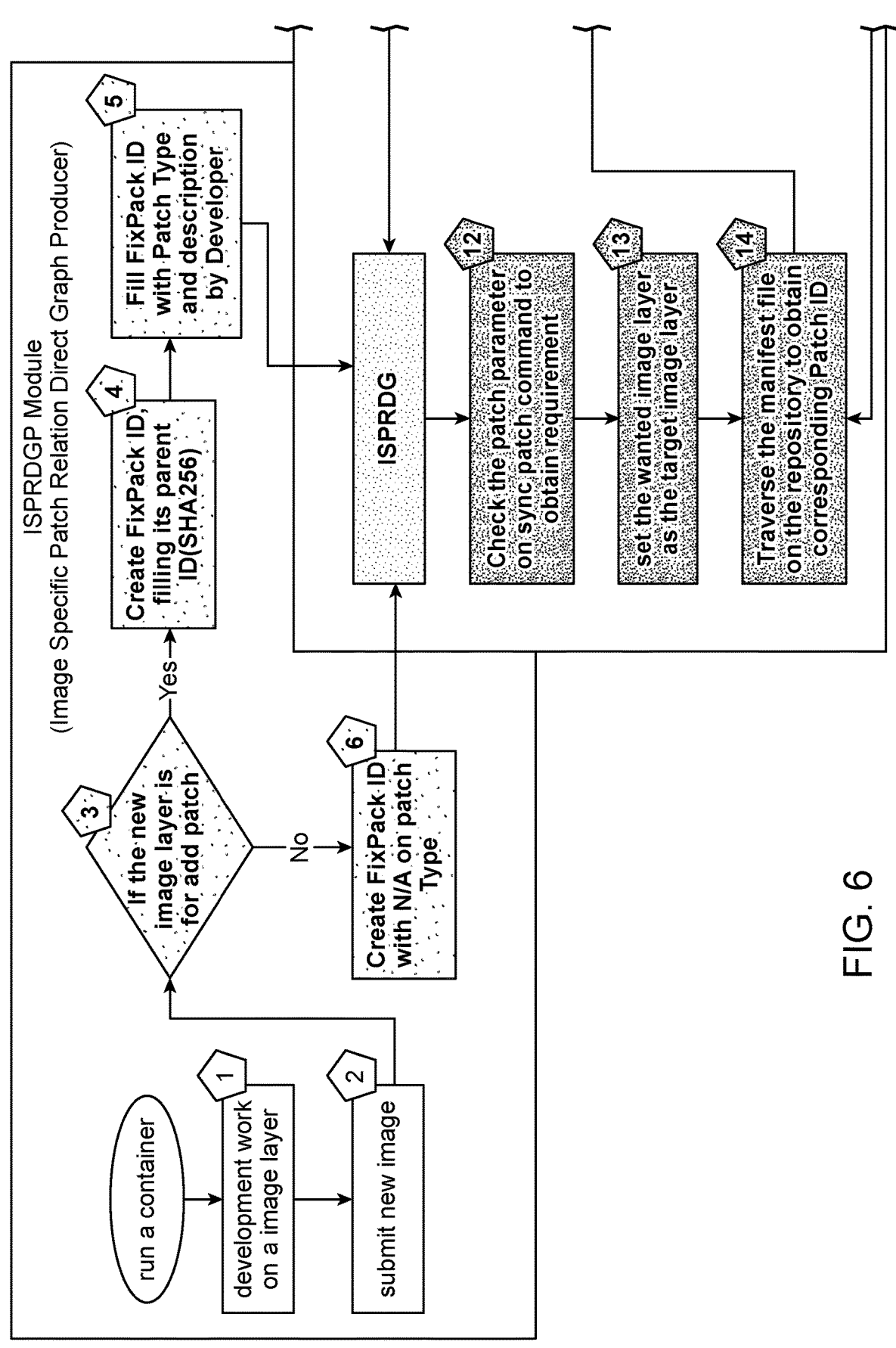
FIG. 6 is a block diagram illustrating a method for automatically redeploying containers on multiple nodes in an IT infrastructure based on patches, in accordance with one or more embodiments of the present invention.
Figure 6:
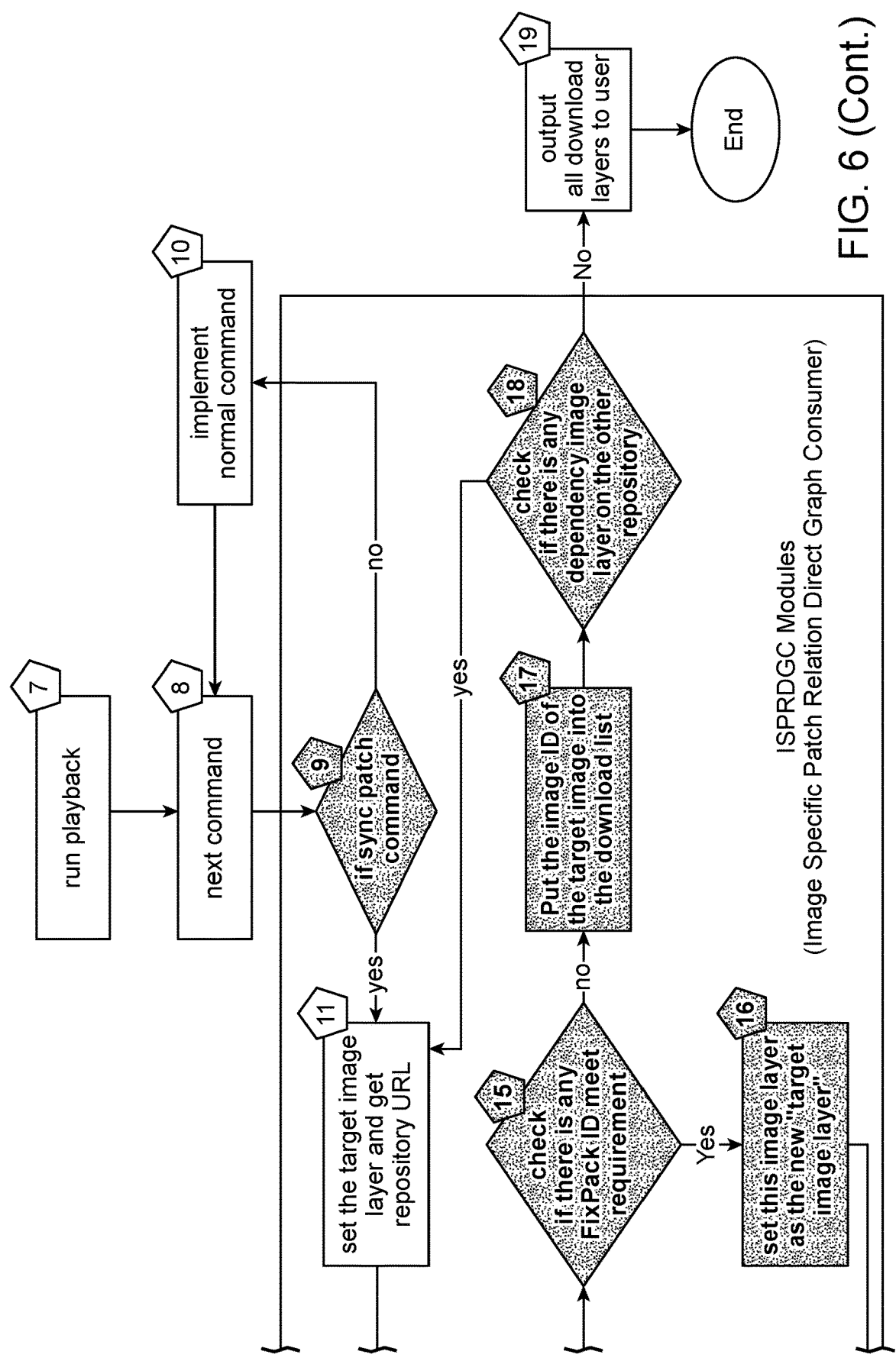
Figure 7:
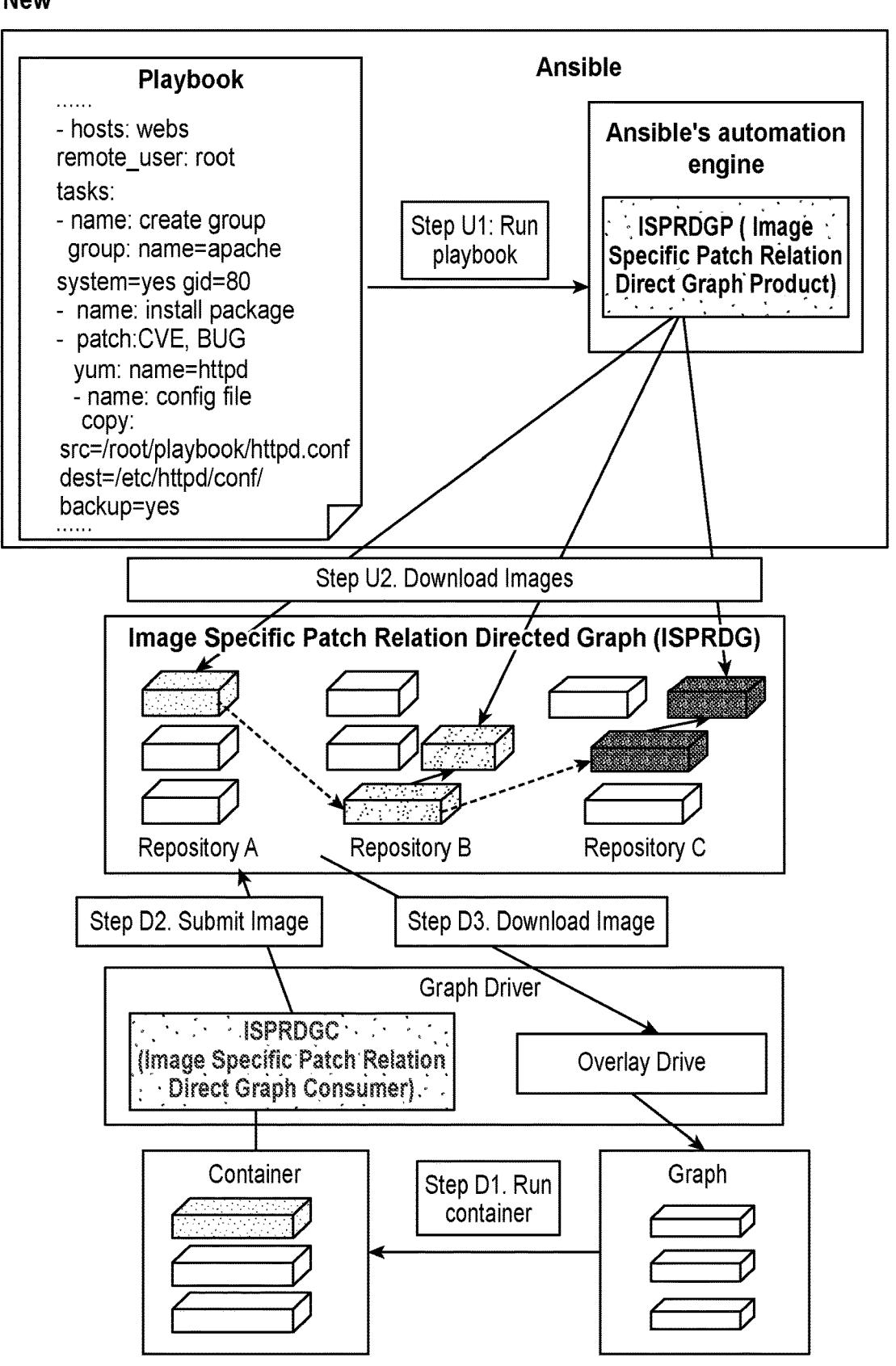
FIG. 7 shows a block diagram illustrating the architecture of an Ansible software program for use in accordance with one or more embodiments of the present invention.

In accordance with an embodiment, a method 400 for automatically redeploying containers on multiple nodes in an IT infrastructure based on patches is provided, as shown in FIG. 5, FIG. 6 and FIG. 7. The method 400 includes introducing and installing a FixPackID attribute and a Sync Patch command in an automated deployment software (e.g., the Ansible software application), as shown in operational block 402. The method 400 further includes introducing and installing an Image Specific Patch Relation Directed Graph Producer (ISPRDGP) module into the automation engine of the automated deployment software (e.g., Ansible's automation engine), as shown in operational block 404 and introducing and installing an Image Specific Patch Relation Directed Graph Consumer (ISPRDGC) module into the Graph Driver of the automated deployment software (e.g., Ansible's Graph Driver), as shown in operational block 406.

Figure 8:
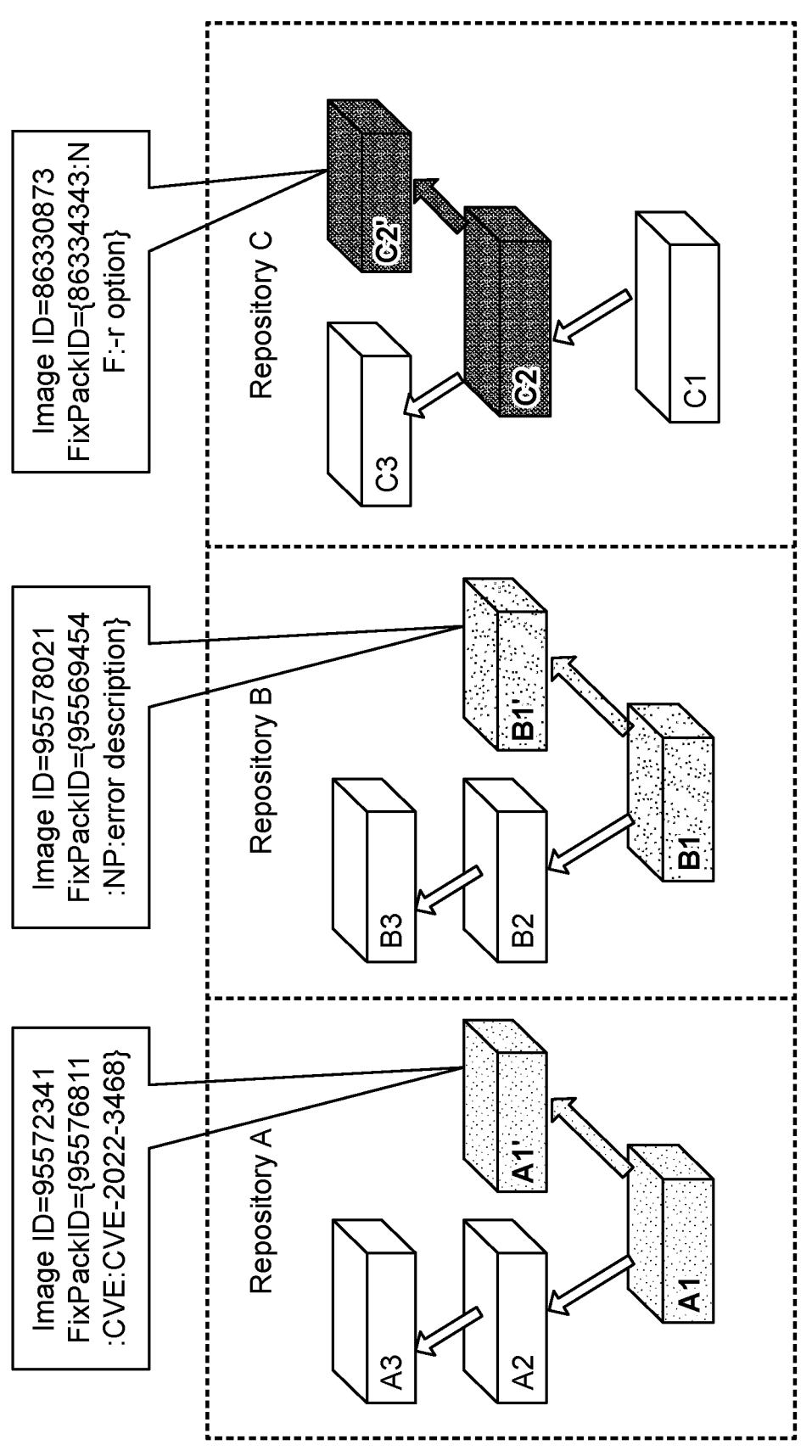
FIG. 8 shows a block diagram illustrating FixPackID and Patch Types, in accordance with one or more embodiments of the present invention.
Figure 9:
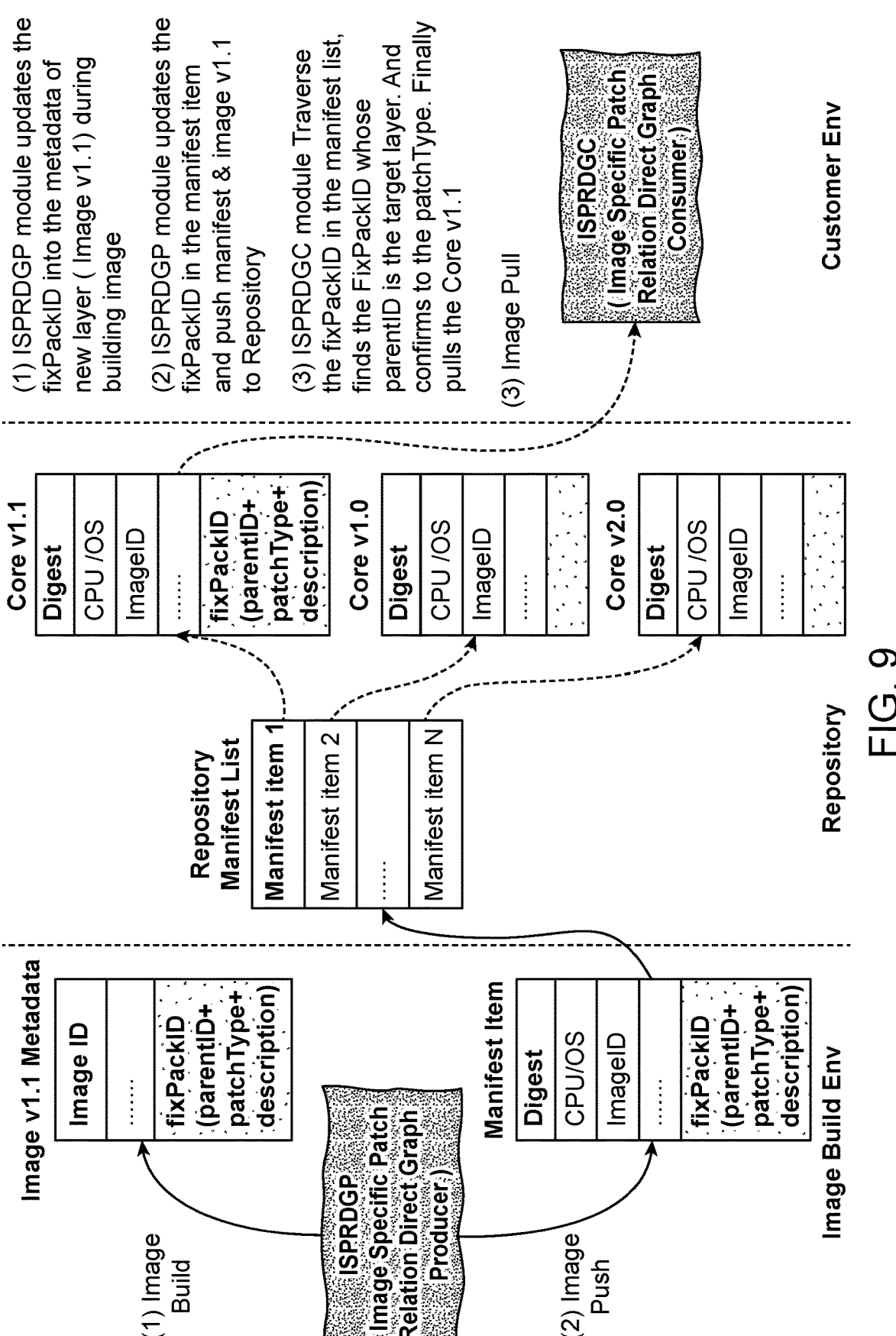
FIG. 9 shows a block diagram illustrating an update flow for FixPackID and the manifest, in accordance with one or more embodiments of the present invention.

The method 400 includes running the automated deployment software configuration and deployment tool (e.g., the Ansible Playbook), wherein the automated deployment software configuration and deployment tool operates the ISPRDGP to update the FixPackID into the metadata of the new layers during the building image operation and update the FixPackID in the manifest item and push the manifest and the new layers to the repository, as shown in operational block 408. Referring to FIG. 7, FIG. 8 and FIG. 9, the FixPackID is configured to record the relationship between the previous layer and the patch layer on repository and create a new attribute of the layer metadata and the manifest configuration file. The FixPackID includes the previous layer's ImageID, the patch type and the patch description, wherein the patch description may record important patch information (e.g., Patch_IDA2=Image_IDA1:CVE:CVE-2022-3408). The patch types may include CVE (CVE fix patch), NP (Bug fix patch), NF (New feature patch) and OTHER (other types of patches). Accordingly, using the ISPRDGP a container is run and new image layer development work is started and the new image layer is submitted into its repository. If the new image is for adding a patch, then the FixPackID is created for the new image layer from its image ID and its related Patch type and the patch description is input into the FixPackID. If the new image is not for adding a patch, then the FixPackID is created for a generalized Patch Type.

The automated deployment software configuration and deployment tool (e.g., Ansible Playbook) further operates the ISPRDGC to install the FixPackID into the manifest list, find the FixPackID whose parentID is the target layer, confirm the patch type and pulls/implements the COREs for the image layers into the production environment and install the patches on the production environment, as shown in operational block 410. The ISPRDGC is configured such that, when the automated deployment software configuration and deployment tool (e.g., Ansible playbook) is run, the next command is activated on the automated deployment software configuration and deployment tool (e.g., Ansible playbook). If the next command is not the "Sync patch" command, then the command is implemented as a normal Ansible command. If the next command is the "Sync patch" command, then the URL of the repository from the sync depend command is obtained and the required repository on the MRIDDG is located. The patch parameter is checked on the sync depend command to identify what kind of patch is needed and the sync wanted image layer is set as the "target image layer." The adjacent upper image layer of the target image layer is traversed to obtain the corresponding FixPackID. If there is any FixPackID that meets the requirement of the sync patch parameter, then that image layer is selected and set as the "target image layer." The adjacent upper image layer of the target image layer is again traversed to obtain the corresponding FixPackID.

If there is any FixPackID that meets the requirement of the sync patch parameter, then that image layer is selected and set as the "target image layer." This is repeated until there are no FixPackIDs that meet the requirement of the sync patch parameter. When there are no FixPackIDs that meet the requirement of the sync patch parameter, the target image layer is inserted into the download list. A dependency mechanism is run to check if there is any dependency image layer on any of the other repository nodes. If there are no dependency image layers on any of the other repository nodes, then the automated deployment software (e.g., Ansible) will download the image layers and send the image layers to the user.

However, if there is a dependency image layer on any of the other repository nodes, then the URL of the repository from the sync depend command is again obtained and the required repository on the MRIDDG is located. The patch parameter is rechecked on the sync depend command to identify what kind of patch is needed and the sync wanted image layer is set as the "target image layer." The adjacent upper image layer of the target image layer is traversed to obtain the corresponding FixPackID. If there is any FixPackID that meets the requirement of the sync patch parameter, then that image layer is selected and set as the "target image layer." The adjacent upper image layer of the target image layer is again traversed to obtain the corresponding FixPackID. If any FixPackID meets the requirement of the sync patch parameter, then that image layer is selected and set as the "target image layer." This is repeated until there are no FixPackIDs that meet the requirement of the sync patch parameter. When there are no FixPackIDs that meet the requirement of the sync patch parameter, the target image layer is inserted into the download list. A dependency mechanism is rerun to check if there is any dependency image layer on any of the other repository nodes. If there is a dependency image layer on any of the other repository nodes, this process is repeated until there are no dependency image layers on any of the other repository nodes, at which point, the automated deployment software configuration and deployment tool (e.g., Ansible) will download the image layers and send the image layers to the user.

It should be appreciated that although the method of the invention is described herein with regards to Ansible, the method of the invention may be used with any suitable configuration management, automation, and server orchestration software devOps software having an automated deployment software configuration and deployment tool.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein. Moreover, the embodiments or parts of the embodiments may be combined in whole or in part without departing from the scope of the invention.

What is claimed is:

1. A method for automatically redeploying containers on multiple nodes in an IT infrastructure based on patches, the method comprising:

installing a FixPackID attribute and a Sync Patch command into an automated deployment software having an automated deployment software configuration and deployment tool;

installing an Image Specific Patch Relation Directed Graph Producer (ISPRDGP) module into the automated deployment software;

installing an Image Specific Patch Relation Directed Graph Consumer (ISPRDGC) module into the automated deployment software;

running the automated deployment software configuration and deployment tool to cause the ISPRDGP to:

update the FixPackID into a metadata file of a new layer during a building image operation, update the FixPackID in a manifest item, and push the manifest item and the new layer to a repository; and running the automated deployment software configuration and deployment tool to cause the ISPRDGC to:

install the FixPackID into a manifest list, identify a FixPackID whose parentID is a target layer, confirm a patch type for a new patch, implement a CORE for the new layers located within a production environment, and install the new patch onto a production environment of the IT infrastructure.

2. The method of claim 1, wherein installing a FixPackID attribute and a Sync Patch command includes running the automated deployment software configuration and deployment tool to install the FixPackID attribute and the Sync Patch Command.

3. The method of claim 1, wherein installing an Image Specific Patch Relation Directed Graph Producer (ISPRDGP) module includes running the automated deployment software configuration and deployment tool to install the ISPRDGP module into an automation engine of the automated deployment software.

4. The method of claim 1, wherein installing an Image Specific Patch Relation Directed Graph Consumer (ISPRDGC) module includes running the automated deployment software configuration and deployment tool to install the ISPRDGC module into a graph driver of the automated deployment software.

5. The method of claim 1, wherein the FixPackID attribute is configured to record a relationship between a previous layer and a patch layer on the repository and to create a new attribute of metadata for the patch layer and for a manifest configuration file.

6. The method of claim 5, wherein the FixPackID attribute includes information about a previous layer's ImageID, a patch type and a patch description, wherein the patch description includes record patch information.

7. The method of claim 1, wherein if the new layer is for adding a new patch, then updating the FixPackID responsive to an image ID of the new layer and a patch type and patch description of the new patch.

8. A computing system, comprising:

a processor set;

one or more computer readable storage media; and program instructions stored on the one or more computer-readable storage media to cause the processor set to perform operations for automatically redeploying containers on multiple nodes in an IT infrastructure based on patches, the operations comprising:

installing a FixPackID attribute and a Sync Patch command into an automated deployment software having an automated deployment software configuration and deployment tool;

installing an Image Specific Patch Relation Directed Graph Producer (ISPRDGP) module into an automation engine of the automated deployment software;

installing an Image Specific Patch Relation Directed Graph Consumer (ISPRDGC) module into a graph driver of the automated deployment software;

running the automated deployment software configuration and deployment tool to cause the ISPRDGP to:

update the FixPackID into a metadata file of new layers during a building image operation, update the FixPackID in a manifest item, and push the manifest item and the new layers to a repository; and running the automated deployment software configuration and deployment tool to cause the ISPRDGC to:

install the FixPackID into a manifest list, identify a FixPackID whose parentID is a target layer, confirm a patch type for a patch, implement a CORE for image layers located within a production environment, and install the patch onto a production environment of the IT infrastructure.

9. The computing system of claim 8, wherein installing a FixPackID attribute and a Sync Patch command includes running the automated deployment software configuration and deployment tool to install the FixPackID attribute and the Sync Patch Command.

10. The computing system of claim 8, wherein installing an Image Specific Patch Relation Directed Graph Producer (ISPRDGP) module includes running the automated deployment software configuration and deployment tool to install the ISPRDGP module into an automation engine of the automated deployment software.

11. The computing system of claim 8, wherein installing an Image Specific Patch Relation Directed Graph Consumer (ISPRDGC) module includes running the automated deployment software configuration and deployment tool to install the ISPRDGC module into a graph driver of the automated deployment software.

12. The computing system of claim 8, wherein the Fix-PackID attribute is configured to record a relationship between a previous layer and a patch layer on the repository and to create a new attribute of metadata for the patch layer and for a manifest configuration file.

13. The computing system of claim 12, wherein the FixPackID attribute includes information about a previous layer's ImageID, a patch type and a patch description, wherein the patch description includes record patch information.

14. The computing system of claim 8, wherein if the new layer is for adding a new patch, then updating the FixPackID responsive to an image ID of the new layer and a patch type and patch description of the new patch.

15. A computer program product comprising a computer readable storage medium having program instructions embodied therewith, the program instructions executable by a processor to cause the processor to perform operations for implementing a method for automatically redeploying containers on multiple nodes in an IT infrastructure based on patches, the method comprising:

installing a FixPackID attribute and a Sync Patch command into an automated deployment software having an automated deployment softwares configuration and deployment tool;

installing an Image Specific Patch Relation Directed Graph Producer (ISPRDGP) module into an automation engine of the automated deployment software;

installing an Image Specific Patch Relation Directed Graph Consumer (ISPRDGC) module into a graph driver of the automated deployment software;

running the automated deployment software configuration and deployment tool to cause the ISPRDGP to:

update the FixPackID into a metadata file of new layers during a building image operation, update the FixPackID in a manifest item, and push the manifest item and the new layers to a repository; and running the automated deployment software configuration and deployment tool to cause the ISPRDGC to:

install the FixPackID into a manifest list, identify a FixPackID whose parentID is a target layer, confirm a patch type for a patch, implement a CORE for image layers located within a production environment, and install the patch onto a production environment of the IT infrastructure.

16. The computer program product of claim 15, wherein installing a FixPackID attribute and a Sync Patch command includes running the automated deployment software configuration and deployment tool to install the FixPackID attribute and the Sync Patch Command.

17. The computer program product of claim 15, wherein installing an Image Specific Patch Relation Directed Graph Producer (ISPRDGP) module includes running the automated deployment software configuration and deployment tool to install the ISPRDGP module into an automation engine of the automated deployment software.

18. The computer program product of claim 15, wherein installing an Image Specific Patch Relation Directed Graph Consumer (ISPRDGC) module includes running the automated deployment software configuration and deployment tool to install the ISPRDGC module into a graph driver of the automated deployment software.

19. The computer program product of claim 15, wherein the FixPackID attribute is configured to record a relationship between a previous layer and a patch layer on the repository and to create a new attribute of metadata for the patch layer and for a manifest configuration file.

20. The computer program product of claim 19, wherein the FixPackID attribute includes information about a previous layer's ImageID, a patch type and a patch description, wherein the patch description includes record patch information.

\* \* \* \* \*